United States Patent [19]
Cho et al.

[11] Patent Number: 6,069,727
[45] Date of Patent: May 30, 2000

[54] LASER SCANNING UNIT

[75] Inventors: Sung-min Cho, Seoul; Hwan-young Choi, Kyonggi-do, both of Rep. of Korea

[73] Assignee: Samsung Electronics Co., Ltd., Kyungki-do, Rep. of Korea

[21] Appl. No.: 08/931,259

[22] Filed: Sep. 16, 1997

[30] Foreign Application Priority Data

Sep. 16, 1996 [KR] Rep. of Korea ............... 96/40178

[51] Int. Cl.$^7$ .................................................. G02B 26/08
[52] U.S. Cl. ..................... 359/226; 359/198; 359/212; 359/223
[58] Field of Search ............................ 359/198, 199, 359/200, 204, 212–215, 221, 223, 224, 226; 347/256–260

[56] References Cited

U.S. PATENT DOCUMENTS

| | | |
|---|---|---|
| 5,235,454 | 8/1993 | Iwasaki ........................... 359/214 |
| 5,428,473 | 6/1995 | Takizawa et al. ............... 359/224 |
| 5,629,790 | 5/1997 | Neukermans et al. .......... 359/198 |
| 5,694,237 | 12/1997 | Melville .......................... 359/214 |

*Primary Examiner*—James Phan
*Attorney, Agent, or Firm*—Sughrue, Mion, Zinn, Macpeak & Seas, PLLC

[57] ABSTRACT

A laser scanning unit in which a digital micro mirror device is used as a laser beam deflecting device and which is used in a laser printer, a facsimile unit, and the like. The laser scanning unit according to the present invention includes a laser diode for emitting laser beams, a photo-sensitive drum for receiving the laser beams emitted by the laser diode, and a deflecting device which is disposed between the laser diode and the photo-sensitive drum, for deflecting the laser beams toward the photo-sensitive drum. The deflecting device comprises a reflecting member for reflecting the laser beams emitted from the laser diode toward the photo-sensitive drum at a predetermined angle, a rotating member for rotating the reflecting member at a range of predetermined angles, and a supporting member for supporting the reflecting member so that the reflecting member can be rotated.

2 Claims, 2 Drawing Sheets

LASER SCANNING UNIT

BACKGROUND OF THE INVENTION

1. Field of the Invention

The present invention relates to a laser scanning unit for scanning information by using laser beams on or from a photo-sensitive drum in a laser printer, a facsimile unit, and the like. More particulary, the present invention relates to a laser beam deflecting device such as a digital micro mirror device which is disposed to be opposite to a photo-sensitive drum in a laser scanning unit, for deflecting laser beams toward the photo-sensitive drum.

2. Description of the Related Art

In general, a laser scanning unit such as one used in a laser printer, includes a laser diode, polygon mirror, and a photo-sensitive drum, and scans information recorded on a hologram disc, by using laser beams.

In the laser scanning unit, increasing the recording speed is achieved by increasing the deflection speed of the laser beams relating to each surface of the polygon mirror which is rotating.

The laser scanning unit scanning the information by using the laser beams forms images in dots on the photo-sensitive drum or reads images from an original draft. The laser scanning unit generally includes a laser diode for emitting laser beams, a laser beam deflecting device for deflecting the laser beams toward the photo-sensitive drum, and lenses for focusing the laser beams on the photo-sensitive drum.

FIG. 1 is a perspective view of a conventional laser scanning unit. The laser scanning unit according to the conventional art comprises a laser diode 100 for emitting laser beams, a collimate lens 101 for reforming the laser beams emitted from laser diode into parallel beams, a cylindrical lens 102 for reforming the parallel beams passing through the collimate lens 101 into linear beams, a polygon mirror 103 for deflecting the linear beams passing through the cylindrical lens 102 in constant velocity, a scanning motor 104 for rotating the polygon mirror 103 in constant velocity, image forming lenses 105 for focusing the laser beams deflected by the polygon mirror 103 on a photo-sensitive drum 107, a reflecting mirror 106 for reflecting the laser beams passing through the image forming lenses 105 and forming image on a surface of the photo-sensitive drum 107 with dots, a horizontal mirror 108 for reflecting a part of laser beams toward a photo detector 109, and the photo detector 109 for receiving a part of laser beams reflected by the horizontal mirror 108 and detecting errors.

The image forming lenses 105 includes a spherical lens 105a for correcting a spherical aberration and collecting the laser beams reflected by the polygon mirror 103 at constant velocity, and a toric lens 105b for focusing the laser beams of which the spherical aberration is corrected by the spherical lens 105a on the photo-sensitive drum 107.

In the laser scanning unit as constructed above, the laser diode 100 emits the laser beams. The laser beams emitted from the laser diode 100 are transformed by the collimate lens 101 into parallel beams.

The parallel beams passing through the collimate lens 101 are transformed by the cylindrical lens 102 into linear beams.

The linear beams passing through the cylindrical lens 102 are reflected by the polygon mirror 103 which is a beam reflecting element and which is mounted on a rotating shaft of the scanning motor 104. Since the polygon mirror 103 is rotated by the scanning motor 104, angles of the mirror surfaces of the polygon mirror 103 relating to the laser beams are changed. Thereby, the laser beams are deflected toward the image forming lenses 105 at the constant velocity.

The image forming lenses 105 correct the spherical aberration of the laser beams which are deflected by the polygon mirror at the constant velocity and focus the laser beams on the photo-sensitive drum. The image forming lenses 105 include the spherical lens 105a for correcting the spherical aberration of the laser beams and the toric lens 105b for focusing the laser beams on the photo-sensitive drum 107.

Therefore, the laser beams passing through the image forming lenses 105 are reflected by the reflecting mirror 106 so as to form an image on the surface of the photo-sensitive drum 107 with dots.

In the laser scanning unit of the conventional art, however, there is a problem in that since the surface of the polygon mirror is flat and inclined, it is very difficult to manufacture the polygon mirror used for deflecting the laser beams.

Also, there is another problem in that since the polygon mirror is rotated at high velocity to print the image at high velocity, the polygon mirror is subject to creating vibration and noise so that a printer is limited in printing speed and quality of image.

Furthermore, there is still another problem in that since an air bearing, a magnetic bearing, or a ball bearing is applied to the scanning motor to increase the rotating velocity of the polygon mirror, the size of the scanning motor increases.

SUMMARY OF THE INVENTION

The present invention has been made to overcome the above described problem of the prior art. It is a major object of the present invention to provide a laser scanning unit having a laser beam deflecting device such as a digital micro mirror device which provides stable printed images and increases printing speed of a printer.

It is another object of the present invention to provide a laser scanning unit having a laser beam deflecting device which has a simple structure and prevents vibration and noise thereof.

To accomplish the above objects of the present invention, there is provided a laser scanning unit comprising:

a laser diode for emitting laser beams;

a photo-sensitive drum for receiving the laser beams emitted by the laser diode; and means for deflecting the laser beams toward the photo-sensitive drum, which is disposed between the laser diode and the photo-sensitive drum, the deflecting means comprising:

a reflecting means for reflecting the laser beams emitted from the laser diode toward the photo-sensitive drum at a predetermined angle;

means for rotating the reflecting means relating to the photo-sensitive drum at a range of predetermined angles; and means for supporting the reflecting means so that the reflecting means can be rotated.

The reflecting means rotating means comprises first electrodes which are attached to a surface of a base of the supporting means and separated at a predetermined distance from each other; and second electrodes which are attached to a surface of the reflecting means and separated at the predetermined distance from each other, wherein the first electrodes respectively are positioned to be opposite to the second electrodes.

The supporting means includes a base, posts which respectively are disposed at both ends of the base, for supporting the reflecting means, and a torsion bar which is attached to the reflecting means and of which both ends are respectively connected to the posts, for functioning as a rotating axis during a rotation of the reflecting means.

BRIEF DESCRIPTION OF THE DRAWINGS

The above objects and other advantages of the present invention will become more apparent by describing in detail the preferred embodiment thereof with reference to the attached drawings, in which.

DETAILED DESCRIPTION OF THE PREFERRED EMBODIMENTS

A laser scanning unit according to an embodiment of the present invention will be described in detail with reference to the accompanying drawings.

Figure 4:
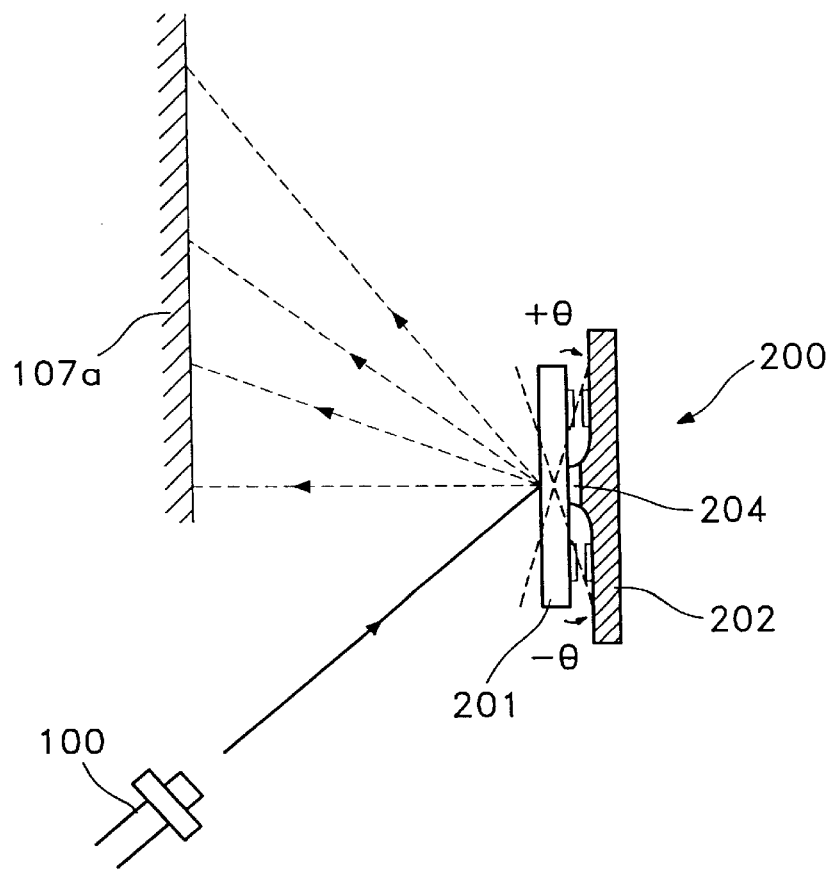
FIG. 4 shows a state of operation of the deflecting device in FIG. 2.

FIG. 4 is a perspective view of the laser scanning unit according to the embodiment of the present invention, to which the deflecting device is applied. The laser scanning unit according to the present invention includes a laser diode 100 for emitting laser beams carrying information, a photo-sensitive drum 107a for receiving the laser beams emitted from the laser diode 100, and the deflecting device 200 for deflecting the laser beams emitted from the laser diode 100 toward the photo-sensitive drum 107a. Futhermore, the laser scanning unit has a collimate lens which is disposed between the laser diode 100 and the deflecting device 200, for reforming the laser beams emitted from the laser diode 100 into parallel beams, a cylinder-shaped lens for reforming the parallel laser beams passing through the collimate lens into a linear beams, and image forming lenses which is disposed between the photo-sensitive drum 107a and the deflecting device 200, for focusing the laser beams on a surface of the photo-sensitive drum 107a.

Figure 1:
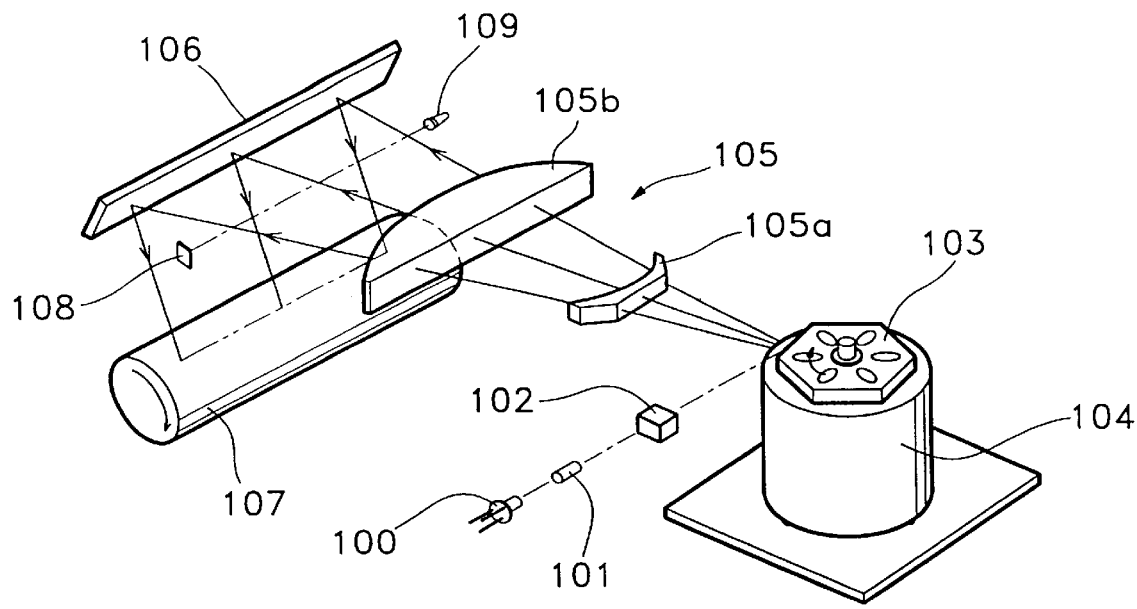
FIG. 1 is a perspective view of a conventional laser scanning unit according.
Figure 2:
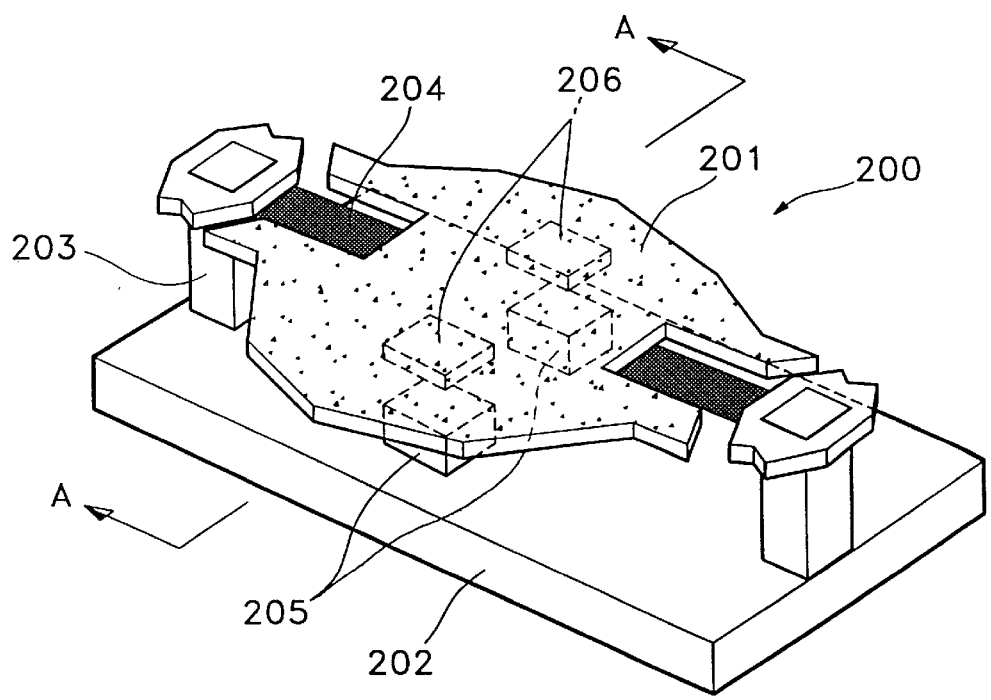
FIG. 2 is a perspective view of a deflecting device according to an embodiment of the present invention, which is applied to a laser scanning unit.

FIG. 2 is a perspective view of the laser beams deflecting device according to the embodiment of the present invention. Referring to FIG. 2, the laser beam deflecting device 200 includes a reflecting member 201 for reflecting the laser beams emitted from the laser diode 100 at a predetermined angle, rotating members 205 and 206 for rotating the reflecting member 201 at a range of predetermined angles, and a supporting member for supporting the reflecting member 201 so that the reflecting member 201 can be rotated.

The reflecting member 201 may be made of a plate of aluminium with blanking. A surface of the reflecting member 201 is a mirror to better reflect the laser beams.

The rotating members 205 and 206 are first and second electrodes. The first and second electrodes are made of a metallic conductive plate formed into a cube. The first electrodes 205 are symmetrically disposed on a base 202 of the supporting member at a predetermined distance around a longitudinal axis of the base 202. The second electrodes 206 are symmetrically disposed on a lower surface of the reflecting member 201 at the predetermined distance around a longitudinal axis of the reflecting member 201. Each of the first electrodes 205 is positioned to be opposite to each of the second electrodes 206. When the first and second electrodes 205, 206 opposed to each other are supplied with electricity having a same polarity or a different polarity, the first and second electrodes 205, 206 have an attraction or a repulsion generated therebetween so as to attract or repulse each other. Therefore, the reflecting member 201 is rotated in a clockwise direction or a countclockwise direction due to the attraction or the repulsion generated between the first electrodes and the second electrodes 205, 206.

The supporting member includes the base 202, posts 203 which are respectively disposed at both ends of the base 202, for supporting the reflecting member 201, and a torsion bar 204 which is attached to the lower surface of the reflecting member 201 and of which both ends are respectively connected to an upper end of each post 203, for functioning as a rotating axis during a rotation of the reflecting member 201. The posts 203 are respectively disposed at ends of the base 202 so as to be positioned on the longitudinal axis of the base 202. One end of each post 203 is connected to the upper surface of the base 202 and the other end of each post 203 extends upward.

Figure 3:
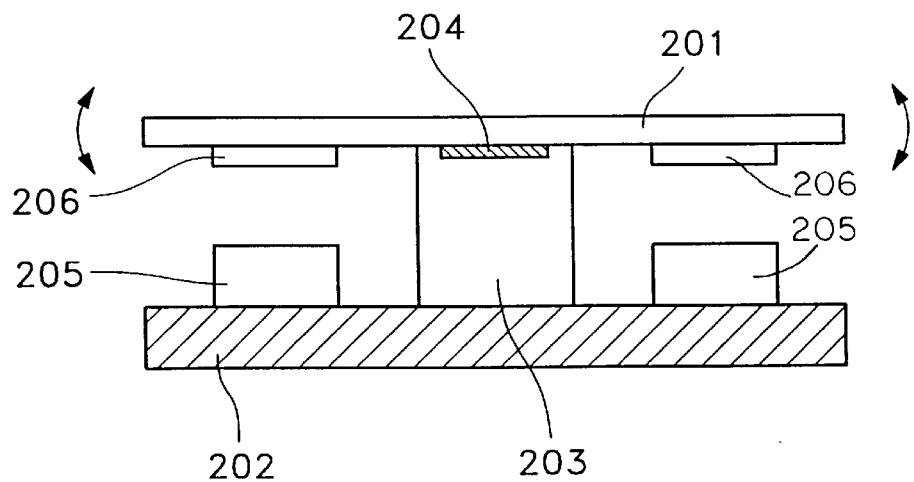
FIG. 3 is a sectional view of the deflecting device according to the embodiment of the present invention, taken along a line A—A in FIG. 2.

FIG. 3 is a sectional view of the deflecting device according to the embodiment of the present invention, taken along line A—A in FIG. 2. Referring to FIG. 3, The connection relation of the reflecting member 201, the first electrodes 205, the second electrodes 206, the base 202 of the supporting member, posts 203, and the torsion bar 204 can be easily understood.

Referring again to FIG. 4, the operation of the laser scanning unit to which the laser beams deflecting device 200 according to the embodiment of the present invention is applied can be understood. In the laser scanning unit of the present invention, as one pair of the first and second electrodes 205, 206 is supplied with electricity having the same polarity and the other pair of the first and second electrodes 205, 206 is supplied with electricity having different polarity, reflecting member 201 rotates around the torsion bar 204 at the range of predetermined angles 2θ in a clockwise or counterclockwise direction. Accordingly, a pathway of the laser beams emitted from the laser diode 100 is changed by the reflecting member 201 of the laser beam deflecting device 200 so as to be oriented toward the image forming lenses.

The polarities of electricity which is supplied for the first and second electrodes 205 and 206 is changed at a predetermined interval by a control signal of a micro-computer.

Hereinafter, the operation of each element of the laser scanning unit according to the present invention described above will be described.

In the laser scanning unit comprising the laser beam deflecting device according to the embodiment of the present invention, the laser beams emitted from the laser diode are transformed into parallel beams and linear beams while passing through the collimate lens and the cylinder-shaped lens, as described above. Then, the laser beam deflecting device reflects the transformed laser beams toward the photo-sensitive drum through the image forming lenses. At this time, electricity having the same polarity is supplied for the first and second electrodes or electricity having the different polarity is supplied for the first and second electrodes so that the attraction or the repulsion between the first electrodes and the second electrodes is generated, thereby the reflecting member can be rotated in a clockwise or counterclockwise direction. Accordingly, the laser beams are reflected in the range of the predetermined angles and oriented toward the photo-sensitive drum.

There are advantages in that since the laser beam deflecting device according to the embodiment of the present invention as mentioned above is applied to the laser scanning unit, an overall size of the laser scanning can be reduced and the laser beam deflecting unit forms stable images so as to improve the printing speed of a laser printer, etc.

While the present invention has been particularly shown and described with reference to a particular embodiment thereof, it will be understood by those skilled in the art that various changes in form and detail may be effected therein without departing from the spirit and scope of the invention as defined by the appended claims.

What is claim is:

1. A laser scanning unit comprising:

a laser diode for emitting laser beams;

a photo-sensitive drum for receiving the laser beams emitted by said laser diode;

means for deflecting the laser beams toward said photo-sensitive drum, which is disposed between said laser diode and said photo-sensitive drum, said deflecting means including means for reflecting the laser beams emitted from said laser diode toward said photo-sensitive drum at a predetermined angle; means for rotating said reflecting means at a range of predetermined angles with respect to said photo-sensitive drum; and means for supporting said reflecting means so that said reflecting means can be rotated, wherein said supporting means includes a base and said reflecting means is rotated about a central axis which is parallel with said base, wherein said rotating means includes a plurality of first electrodes which are attached to a surface of a base of said supporting means and separated at a predetermined distance from each other; and a plurality of second electrodes which are attached to a surface of said reflecting means and separated at the predetermined distance from each other, wherein said first electrodes are positioned to be opposite to said second electrodes respectively.

2. A laser scanning unit as claimed in claim 1, wherein said supporting means includes said base, posts which respectively are disposed at both ends of said base, for supporting said reflecting means, and a torsion bar having two ends, attached to said reflecting means wherein the two ends are respectively connected to said posts, for functioning as a rotating axis of said reflecting means.

* * * * *